United States Patent
Liu et al.

(10) Patent No.: US 9,906,646 B2
(45) Date of Patent: Feb. 27, 2018

(54) SMART CALL DEVICE, SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Fang-Hua Liu, Shenzhen (CN); Zhe Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/602,123

(22) Filed: May 23, 2017

(65) Prior Publication Data

US 2017/0346946 A1    Nov. 30, 2017

(30) Foreign Application Priority Data

May 24, 2016  (CN) .......................... 2016 1 0348995

(51) Int. Cl.
| | |
|---|---|
| H04M 3/42 | (2006.01) |
| H04M 3/436 | (2006.01) |
| H04B 1/3827 | (2015.01) |
| G06K 9/00 | (2006.01) |
| G06F 3/01 | (2006.01) |
| G06F 17/30 | (2006.01) |
| H04W 84/12 | (2009.01) |
| H04W 4/00 | (2018.01) |

(52) U.S. Cl.
CPC ............ *H04M 3/436* (2013.01); *G06F 3/011* (2013.01); *G06F 17/3028* (2013.01); *G06F 17/30256* (2013.01); *G06K 9/00255* (2013.01); *G06K 9/00288* (2013.01); *H04B 1/3833* (2013.01); *H04M 3/42093* (2013.01); *H04W 4/008* (2013.01); *H04W 84/12* (2013.01)

(58) Field of Classification Search
CPC ......... H04M 1/27455; H04M 1/72583; H04M 2250/22; H04M 1/274583; H04M 1/274516; H04W 4/02; H04W 4/08; H04W 4/16
USPC .................. 455/416, 556.1, 566, 414.1, 461
See application file for complete search history.

(56) References Cited

U.S. PATENT DOCUMENTS

| | | | |
|---|---|---|---|
| 2009/0122198 A1* | 5/2009 | Thorn ................ | G06K 9/00221 348/715 |
| 2014/0011487 A1* | 1/2014 | Hwang ............. | G06K 9/00221 455/416 |

(Continued)

*Primary Examiner* — Joseph Arevalo
(74) *Attorney, Agent, or Firm* — ScienBiziP, P.C.

(57) ABSTRACT

A smart call method is applied in a smart call device, there being a first handheld device and a second handheld device containing the smart call device. The first and second handheld devices are bound and communicate with the smart call device. The smart call device receives an incoming call signal from the first handheld device and acquires images of nearby faces through an image acquisition unit in response. The first handheld device compares the acquired face images with stored user face images of the second handheld device. The smart call device sends a control signal to the first handheld device according to a successful comparison and the first handheld device calls the second handheld device bound with the smart call device.

11 Claims, 6 Drawing Sheets

(56) References Cited

U.S. PATENT DOCUMENTS

| | | | |
|---|---|---|---|
| 2014/0359483 A1* | 12/2014 | Forutanpour | H04L 67/10 |
| | | | 715/753 |
| 2015/0178553 A1* | 6/2015 | Yoo | G06F 17/30256 |
| | | | 382/118 |
| 2015/0373477 A1* | 12/2015 | Norris | H04M 1/72572 |
| | | | 381/303 |
| 2016/0006772 A1* | 1/2016 | Shimizu | H04L 65/403 |
| | | | 709/204 |
| 2017/0013464 A1* | 1/2017 | Fish | H04W 12/12 |
| 2017/0185808 A1* | 6/2017 | Zhang | H04M 1/72577 |

\* cited by examiner

SMART CALL DEVICE, SYSTEM AND METHOD

CROSS-REFERENCE TO RELATED APPLICATIONS

This application claims priority to Chinese Patent Application No. 201610348995.X filed on May 24, 2016, the contents of which are incorporated by reference herein.

FIELD

The subject matter herein generally relates to communication field, especially relates to a smart call device, system and method.

BACKGROUND

Traditional call device broadcasts sound to inform the callee, thus interfering with other people. When the callee does not take the call because of temporary absence for example, the traditional call will fail to be connected.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
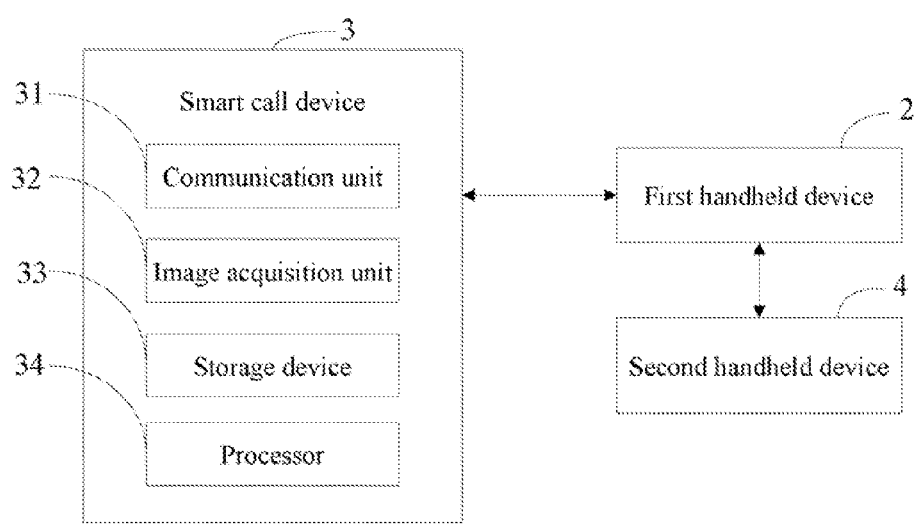
FIG. 1 is a block diagram of an embodiment of a running environment of a smart call device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

FIG. 1 illustrates an embodiment of a running environment of a smart call device 3. The smart call device 3 is used to receive an incoming call signal sent by at least one first handheld device 2, identify from images one or more faces of people around the smart call device 3 in response to the signal, and can transmit a control signal after identifying a face around the smart call device 3. The at least one first handheld device 2 receives the control signal and forwards or calls a second handheld device 4 in response to the control signal.

The smart call device 3 includes a communication unit 31, an image acquisition unit 32, a storage device 33, and at least one processor 34. The smart call device 3 is able to communicate with the first handheld device 2 through the communication unit 31. In at least one embodiment, the communication unit 31 can be a WI-FI communication module, a BLUETOOTH communication module, an infrared communication module or other suitable wireless communication module. In another embodiment, the communication unit 31 can be wired communication module. The image acquisition unit 32 is used to acquire face images around the smart call device 3. In at least one embodiment, the image acquisition unit 32 can be a camera or a face recognition device. The storage device 33 stores data of the smart call device 3. In at least one embodiment, the storage device 33 can include various types of non-transitory computer-readable storage mediums. For example, the storage device 33 can be an internal storage system, such as a flash memory, a random access memory (RAM) for temporary storage of information, and/or a read-only memory (ROM) for permanent storage of information. In another embodiment, the storage device 33 can also be an external storage system, such as a hard disk, a storage card, or a data storage medium. The at least one processor 34 is used to execute software program code or operational data stored in the storage device 33. The at least one processor 34 can be a central processing unit (CPU), a microprocessor, or other data processor chip.

The at least one first handheld device 2 communicates with the smart call device 3 and the second handheld device 4. Further, the smart call device 3, the second handheld device 4, and the user of the second handheld device 4 are bound together. In at least one embodiment, the smart call device 3 receives identification of the second handheld device 4 and user face images of the second handheld device 4 sent by the second handheld device 4, and stores and establishes a relationship table defining a relationship among identification of the smart call device 3, the identification of the second handheld device 4, and the user face images of the second handheld device 4. Thus, the smart call device 3, the second handheld device 4 and the user of the second handheld device are bound together. In at least one embodiment, the identification of the smart call device 3 includes other information of the smart call device 3. The identification of the second handheld device 4 includes other information of the second handheld device 4. For example, the identification of the smart call device 3 can be phone number of the smart call device 3, the identification of the second handheld device 4 can be phone number of the second handheld device 4.

In at least one embodiment, the at least one processor 34 receives the incoming call signal sent by at least one first handheld device 2, and controls the image acquisition unit 32 to acquire face images around the smart call device 3 in response to the incoming call signal. The at least one processor 34 further compares the acquired face images with stored user face images of the second handheld device 4, and sends a control signal to the first handheld device 2 according to a comparison. The first handheld device 2 receiving the control signal can call the second handheld device 4 bound with the smart call device 3 in response to the control signal. In at least one embodiment, the incoming call signal includes identification of the smart call device 3. When receiving the incoming call signal, the at least one processor 34 compares the identification of the signal with the stored identification of the smart call device 3. When the identification of the signal is identical with the stored identification of the smart call device 3, the at least one processor 34 determines a target face corresponding to the identification of the incoming call signal from the relationship table, acquires the face images through the image acquisition unit 32, and compares the target face image with the face images acquired through the image acquisition unit 32.

In at least one embodiment, when one acquired face image matches with the target face image, the at least one processor 34 sends a first control signal to the first handheld device 2. When the first handheld device 2 receives the first control signal, the first handheld device 2 sends text message to the second handheld device 4. When none of the images match the target face image, the at least one processor 34 sends a second control signal to the first handheld device 2. When the first handheld device 2 receives the second control signal, the first handheld device 2 sends a voice message to the second handheld device 4 to prompt the user of the second handheld device 4. In at least one embodiment, the first handheld device 2 communicates with the second handheld device through 3G or 4G wireless communication network.

Figure 2:
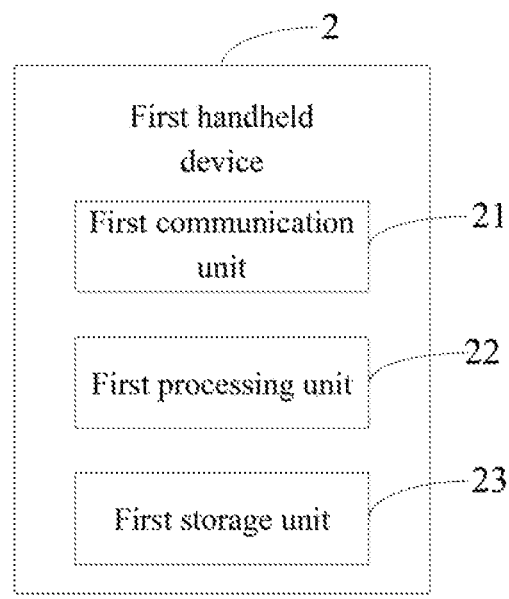
FIG. 2 is a block diagram of an embodiment of a first handheld device of FIG. 1.

FIG. 2 illustrates the first handheld device 2. In at least one embodiment, the first handheld device 2 can be a smart phone. The first handheld device 2 includes a first communication unit 21, a first processing unit 22, and a first storage unit 23. The first handheld device 2 communicates with the smart call device 3 and the first handheld device 2 through the first communication unit 21. In at least one embodiment, the first communication unit 21 can be a WI-WI communication module or a BLUETOOTH communication module. The first storage unit 23 stores the relationship table defining a relationship among an identification of the smart call device 3, an identification of the second handheld device 4, and user face images of the second handheld device 4. The first storage unit 23 can include various types of non-transitory computer-readable storage mediums. For example, the first storage unit 23 can be an internal storage system of the first handheld device 2, such as a flash memory, a random access memory (RAM) for temporary storage of information, and/or a read-only memory (ROM) for permanent storage of information. The first processing unit 22 is used to execute software program code or operational data stored in the first storage unit 23. The first processing unit 22 can be a central processing unit (CPU), a microprocessor, or other data processor chip.

Figure 3:
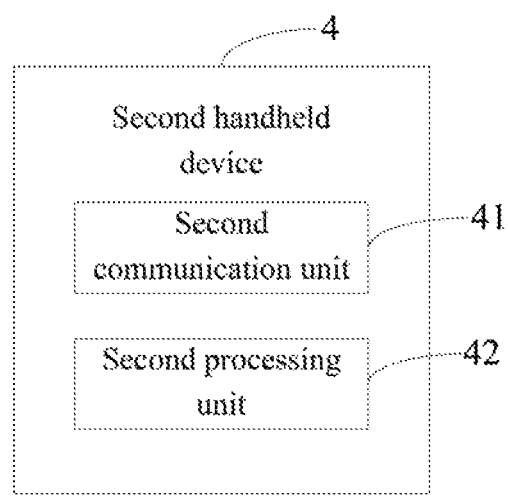
FIG. 3 is a block diagram of an embodiment of a second handheld device of FIG. 1.

FIG. 3 illustrates the second handheld device 4. In at least one embodiment, the second handheld device 4 can be a smart phone. The second handheld device 4 includes a second communication unit 41, a second processing unit 42, and a second processing unit 43. The second handheld device communicate with the first handheld device through the second communication unit 41. In at least one embodiment, the second communication unit 41 can be a WI-FI communication module or a BLUETOOTH communication module. The second storage unit 43 can be an internal storage system of the second handheld device 4, such as a flash memory, a random access memory (RAM) for temporary storage of information, and/or a read-only memory (ROM) for permanent storage of information. The second processing unit 42 is used to execute software program code or operational data stored in the second handheld device 4. The second processing unit 42 can be central processing unit (CPU), a microprocessor, or other data processor chip.

Figure 4:
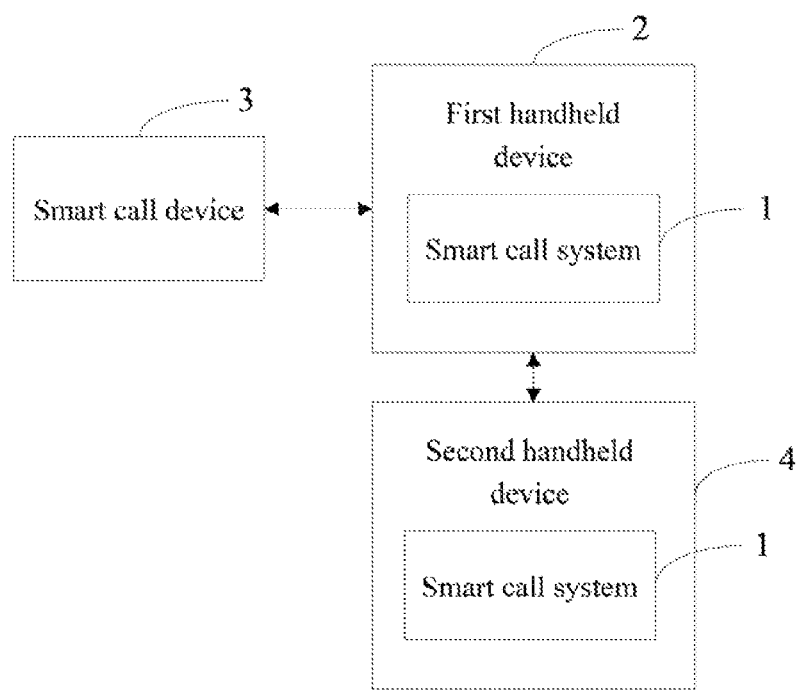
FIG. 4 is a block diagram of an embodiment of a running environment of a smart call system.

FIG. 4 illustrates a running environment of a smart call system 1. The smart call system 1 is run in the first handheld device 2, in the smart call device 3, and in the second handheld device 4. The smart call system 1 is used to control the first handheld device 2 to send the incoming call signal to the smart call device 3. Thus, the smart call device 3 identifies faces around the smart call device 3 in response to the incoming call signal. The smart call system 1 further receives the control signal sent by the smart call device 3, and controls the first handheld device 2 to call the second handheld device 4 which is bound with the smart call device 3.

Figure 5:
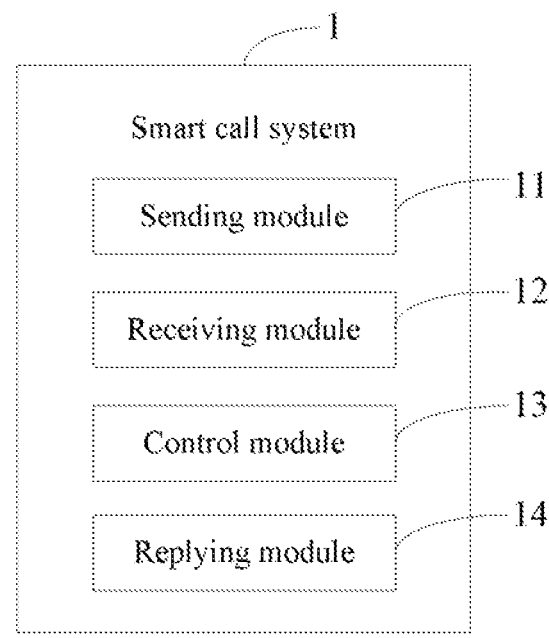
FIG. 5 is a block diagram of an embodiment of the smart call system of FIG. 4.

FIG. 5 illustrates the smart call system 1. The smart call system 1 includes, but is not limited to, a sending module 11, a receiving module 12, a control module 13, and a replying module 14. The modules 11-13 of the smart call system 1 can be collections of software instructions stored in the first storage unit 23 and executed by the first processing unit 22. The replying module 14 of the smart call system 1 can be collections of software instructions stored in the second storage unit 43 and executed by the second processing unit 42.

The sending module 11 sends the incoming call signal to the smart call device 3 through the first communication unit 21. In at least one embodiment, the incoming call signal includes identification of the smart call device 3.

The receiving module 12 receives the control signal sent by the smart call device 3.

The control module 13 controls the first handheld device 2 to call the second handheld device 4 bound with the smart call device 3 in response to the control signal. In at least one embodiment, the control module 13 determines the identity of the second handheld device 4 according to the identification in the incoming call signal and the relationship table. The control module 13 further calls the determined second handheld device 4.

In at least one embodiment, when the smart call device 3 receives the incoming call signal sent by the first handheld device 3, the smart call device 3 acquires face images around the smart call device 3, compares the acquired face images with stored user face of the second handheld device 4 in the relationship table, and sends the control signal to the first handheld device 2 according to the comparison. In at least one embodiment, when receiving the incoming call signal, the smart call device 3 compares the identification in the incoming call signal with the stored identification of the smart call device 3. When the identification in the incoming call signal is identical with the stored identification of the smart call device 3, the smart call device 3 determines a target face image corresponding to the identification of the incoming call signal from the relationship table, acquires the face images through the image acquisition unit 32, and compares the acquired face images with the target face image. When one acquired face image matches with the target face image, the smart call device 3 sends a first control signal to the first handheld device 2. When the receiving module 12 receives the first control signal, the control module 13 sends text message to call the second handheld device 4 bound with the smart call device 3. When none of the acquired face image matches with the target face image, the smart call device 3 sends a second control signal to the first handheld device 2. When the receiving module 12 receives the second control signal, the control module 13 sends a voice message to the second handheld device 4 bound with the smart call device 3 to prompt the user of the second handheld device 4 as to the incoming call. For example, the text message can be "number XXX called you at . . . time . . . date . . . , please reply."

The replying module 14 is used to control the second handheld device 4 bound with the smart call device 3 to reply a replying message to the first handheld device 1 when the first handheld device 2 is calling the second handheld device 4. In at least one embodiment, the replying message can be a preset information. Fox example, the replying message can be "On the way" or "Absent for next hour."

Figure 6:
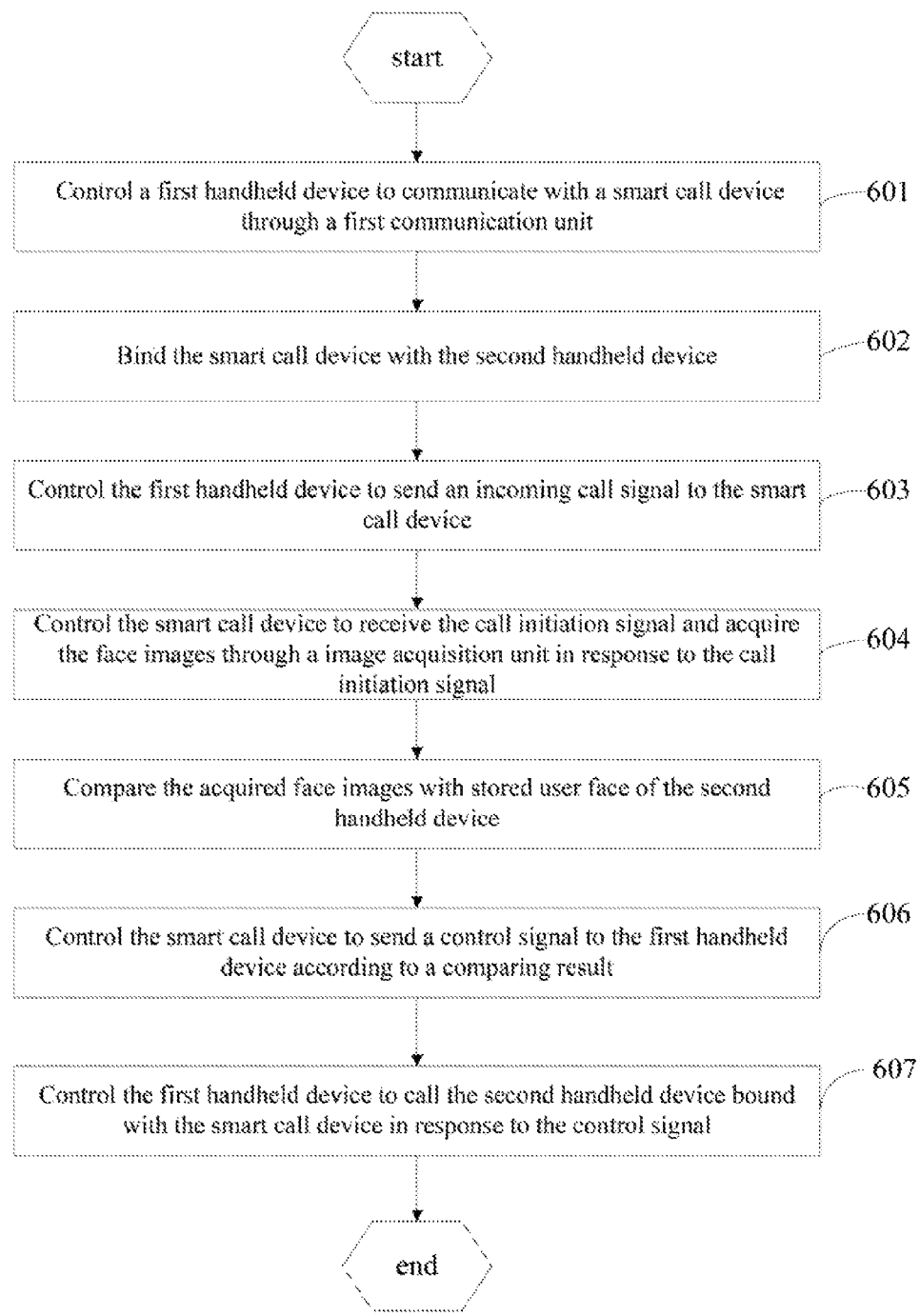
FIG. 6 is a flowchart of an embodiment of a smart call method for the devices of FIG. 1, FIG. 2, and FIG. 3.

FIG. 6 illustrates a flowchart of the smart call method. The method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 601.

At block 601, a first handheld device communicates with a smart call device through a first communication unit.

At block 602, the smart call device is bound with the second handheld device. In at least one exemplary, the smart call device receives identification of the second handheld device and user face images of the second handheld device sent by the second handheld device, and establish a relationship table defining a relationship among identification of the smart call device, the identification of the second handheld device and the user face images of the second handheld device. Thus, the smart call device is bound with second handheld device. In at least one exemplary embodiment, the identification of the smart call device includes identification information of the smart call device. The identification of the second handheld device includes identification information of the second handheld device.

At block 603, the first handheld device sends an incoming call signal to the smart call device. In at least one embodiment, the incoming call signal includes identification of the smart call device.

At block 604, the smart call device receives the incoming call signal and acquires the face images through a image acquisition unit in response to the incoming call signal. In at least one exemplary embodiment, when receiving the incoming call signal, the smart call device compares the identification of the incoming call signal with the stored identification of the smart call device 3. When the identification of the incoming call signal is identical with the stored identification of the smart call device 3, the smart call device 3 acquires the face images through the image acquisition unit 32.

At block 605, the smart call device compares the acquired face images with stored user face of the second handheld device. In at least one exemplary embodiment, the smart call device determines a target face image corresponding to the identification of the incoming call signal from the relationship table, and compares the acquired face images with the target face.

At block 606, the smart call device sends a control signal to the first handheld device according to a comparing result. When the target face image is matched with one acquired face image, the smart call device sends a first control signal to the first handheld device. When none of the acquired face images match the target face image, the smart call device sends a second control signal to the first handheld device.

At block 607, the first handheld device calls the second handheld device bound with the smart call device in response to the control signal.

The method further includes: when receiving the first control signal, the first handheld device sends text message to call the second handheld device bound with the smart call device; or when receiving the second control signal, the first handheld device sends a voice message to the second handheld device bound with the smart call device to prompt the user of the second handheld device.

The method further includes: the second handheld device replies a replying message to the first handheld device when the first handheld device is calling the second handheld device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:
1. A smart call device comprising:
a communication unit;
an image acquisition unit configured to acquire face images around the smart call device;
at least one processor coupled to the communication unit, and the image acquisition unit;
a non-transitory storage medium coupled to the at least one processor and configured to store a plurality of instructions, which cause the at least one processor to control the smart call device to:
receive an incoming call signal sent by a first handheld device through the communication unit, wherein the incoming call signal comprises an identification of the smart call device;
control the image acquisition unit to acquire face images around the smart call device in response to the incoming call signal;

compare the acquired face images with stored user face images of a second handheld device bound with the smart call device; and send a control signal to the first handheld device to control the first handheld device to call the second handheld device according to a comparing result;

receive identification of the second handheld device and the user face images of the second handheld device sent by the second handheld device; and establish a relationship table defining a relationship among the identification of the smart call device, the identification of the second handheld device, and the user face images of the second handheld device to bind the smart call device with the second handheld device.

2. The device as recited in claim 1, wherein the plurality of instructions is further configured to cause the smart call device to:

compare the identification of the incoming call signal with the stored identification of the smart call device;

determine a target face image corresponding to the identification of the incoming call signal from a relationship table when the identification of the incoming call signal is identical with the stored identification of the smart call device; and compare the target face image with the face images acquired through the image acquisition unit.

3. The device as recited in claim 2, wherein the plurality of instructions is further configured to send a first control signal to the first handheld device when one acquired face image matches with the target face image.

4. The device as recited in claim 2, wherein the plurality of instructions is further configured to send a second control signal to the first handheld device when none of the acquired face image matches with the target face image.

5. A smart call method, applied in a smart call device, a first handheld device, and a second handheld device communicating with the first handheld device, the method comprising:

control the first handheld device to communicate with the smart call device;

bind the smart call device with the second handheld device;

control the first handheld device to send an incoming call signal to the smart call device, wherein the incoming call signal comprises an identification of the smart call device;

control the smart call device to receive the incoming call signal and acquire face images through an image acquisition unit in response to the incoming call signal;

compare the acquired face images with stored user face images of the second handheld device;

control the smart call device to send a control signal to the first handheld device according to a comparing result;

control the first handheld device call the second handheld device in response to the control signal;

control the smart call device to receive identification of the second handheld device and the user face images of the second handheld device sent by the second handheld device; and control the smart call device to establish a relationship table defining a relationship among the identification of the smart call device, the identification of the second handheld device, and the user face images of the second handheld device to bind the smart call device with the second handheld device.

6. The method as recited in claim 5, further comprising:

compare the identification of the incoming call signal with the stored identification of the smart call device;

determine a target face image corresponding to the identification of the incoming call signal from a relationship table when the identification of the incoming call signal is identical with the stored identification of the smart call device; and compare the target face image with the face images acquired through the image acquisition unit.

7. The method as recited in claim 6, further comprising:

send a first control signal to the first handheld device when one acquired face image matches with the target face image.

8. The method as recited in claim 7, further comprising:

control the first handheld device to send a text message to call the second handheld device when receiving the first control signal.

9. The method as recited in claim 6, further comprising:

send a second control signal to the first handheld device when none of the acquired face image matches with the target face image.

10. The method as recited in claim 9, further comprising:

send a voice message to the second handheld device when receiving the second control signal.

11. The method as recited in claim 9, further comprising:

control the second handheld device to reply a replying message to the first handheld device when the first handheld device is calling the second handheld device.

* * * * *